United States Patent [19]
Rainville

[11] 4,091,383
[45] May 23, 1978

[54] GAME SAVER DEVICE

[76] Inventor: Frederick Rainville, R.D. #1, Argyle, N.Y. 12809

[21] Appl. No.: 794,037

[22] Filed: May 5, 1977

[51] Int. Cl.² ............................................. G08B 3/00
[52] U.S. Cl. ............................ 340/384 R; 340/52 R; 340/384 E
[58] Field of Search .............. 340/52 R, 384 E, 384 R

[56] References Cited
U.S. PATENT DOCUMENTS 4,001,817  1/1977  Squires ........................... 340/384 E Primary Examiner—Harold I. Pitts

[57] ABSTRACT

A game saver device for scaring animals off of the road, wherein the device includes an ultrasonic wave generating system having speakers which are disposed in a housing. A mechanism is provided for securing the housing to the front grill of an automobile.

1 Claim, 4 Drawing Figures

GAME SAVER DEVICE

BACKGROUND OF THE INVENTION

A number of U.S. Patents relate to ultrasonic wave generating systems for the control of rodents, but these are nonapplicable to my present invention for mounting on an automobile. These patents, herein incorporated by reference, are: 3,049,676 to Zinke; 3,311,868 to Cupp; 3,609,201 to Adachi; 3,636,559 to Grande; 3,838,418 to Brown; 3,872,472 to Moschgat; and 3,893,106 to Schuleen.

SUMMARY OF THE INVENTION

My present invention relates to a unique and novel game saver device adapted to be removably mounted onto a front grill of an automobile.

An object of my present invention is to provide an improved game saver device adapted to be removably mounted on an automobile, wherein the device emits an ultrasonic sound so as to scare an animal off of the road so that the animal is not hit by the car. Some animals are dogs, cats, deer, racoons, skunks, ground hogs, horses, or cows.

A further object of my present invention is to provide a unique and novel means for removably securing the device to the automobile.

Briefly, my present invention includes an ultrasonic wave generating system having speakers which are disposed in a housing. A means is provided for securing the housing to the front grill of the automobile.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
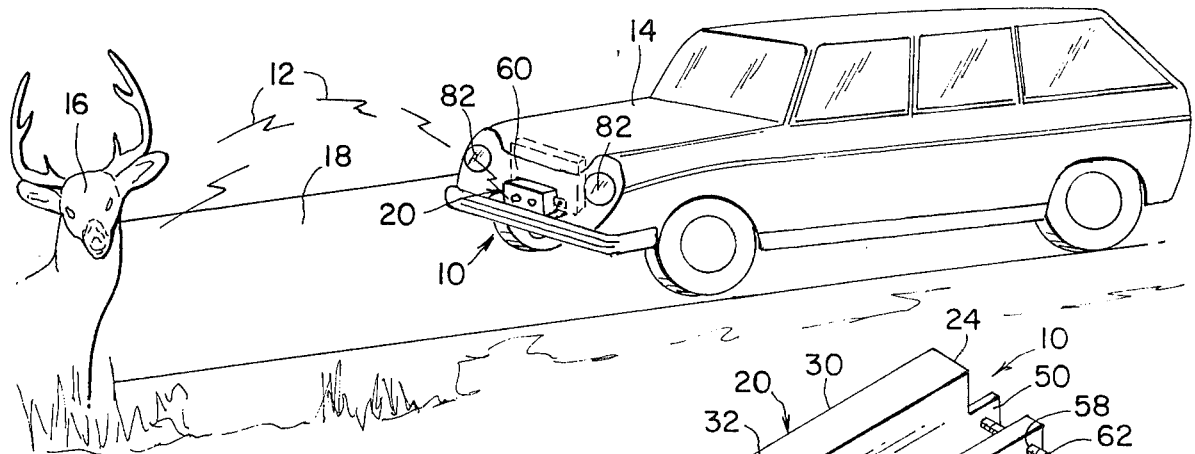
FIG. 1 illustrates a perspective view of a game saver device mounted on an automobile.
Figure 3:
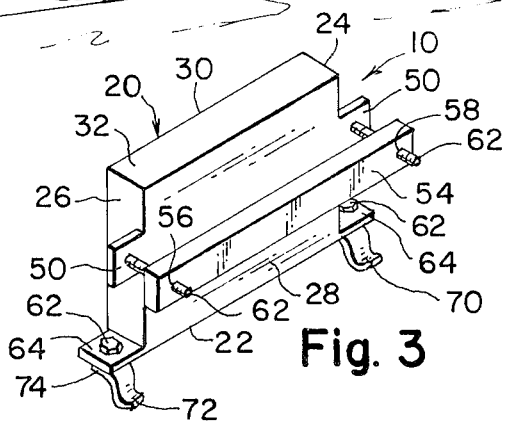
FIG. 3 illustrates a perspective view of the device.
Figure 2:
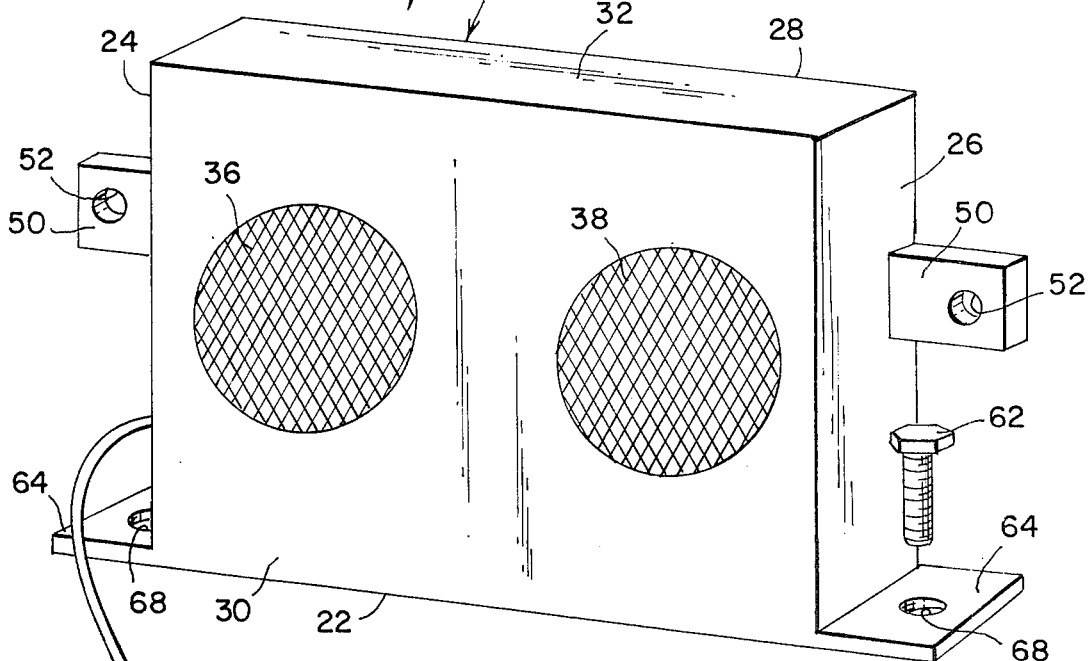
FIG. 2 illustrates a perspective view of the device.
Figure 4:
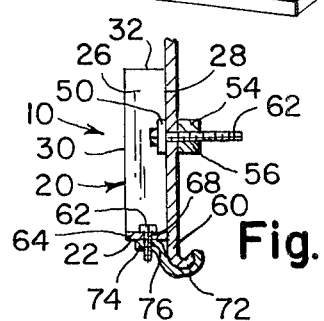
FIG. 4 illustrates a side cross-sectional view of the device mounted on the automobile.

Turning now descriptively to the drawings, in which similar reference characters denote similar elements throughout the several views, FIGS. 1–4 show a game saver device 10 adapted to be mounted on an automobile 14. The device 10 emits ultrasonic waves 12 whose frequencies are continuously randomly varied throughout its operating range. The ultrasonic waves 12 are directly forwardly of the automobile 14 to scare deer 16 which are sensitive and responsive to these waves 12, thereby causing the deer 16 off of the road 18. The device 10 includes a rectangularly shaped box housing 20 having a base 22, a pair of upwardly extending end walls 24, 26, an upwardly extending rear wall 28, an upwardly extending front wall 30, a top 32 and a chamber therein. Disposed within the chamber is a conventional ultrasonic wave generating system having a plurality of electrically energizable ultrasonic transducers, each transducer capable of producing ultrasonic waves to be transmitted outwardly through a pair of speakers 36, 38 disposed in the front wall 30. A means including a voltage controlled oscillator to produce an ultrasonic signal whose frequency lies in a range above the human hearing range to which the deer 16 are sensitive. An electronic gate for intermittently applying the signal from the oscillator to each transducer for brief intervals whereby pulses of ultrasonic energy are radiated by the transducer. A means is provided to apply to the oscillator during the intervals held voltages having random valves. The oscillator generates a signal of ultrasonic pulses having random frequencies such that the deer are unable to acquire deafness immunity. To each end wall 24, 26 is mounted a mounting plate element 50 having a hole 52 therethrough, wherein each plate element 50 extends perpendicularly outwardly from one of the end walls and is parallel to the rear wall 28. A first elongated bar member 54 has a pair of transverse end apertures 56, 58 therethrough. The bar member 54 is disposed behind a front grill 60 of the automobile 14. The rear wall 28 is disposed against the front face of the grill 60. Bolt members 62 extend through the holes 52 of element 50 and apertures 56, 58 of bar member 54 thereby securing the device 10 to the automobile 14. A pair of plate members 64, with transverse holes 68 therethrough extend linearly outwardly from each end of the base 22. A pair of hooked shaped clamps 70, 72 are provided, wherein one end 74 of each clamp 70, 72 has a circular opening 76 therethrough. The other end of each clamp hooks onto the undeside of the frame of the automobile 14. Bolt members 62 extend through holes 68 of plate members 64 and openings 76 of clamps 70, 72 so as to secure the clamps 70, 72 to the plate member 64.

A power electrical cable 80 is joined at one end to the ultrasonic wave generating system, and the other end of cable 80 is electrically joined to the light circuit of the automobile such that the ultrasonic system is activated, when the headlights 82 of the automobile are turned on.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An improved game saver device adapted to be mounted on a front grill of an automobile, said device including a conventional ultrasonic wave generating system for producing an ultrasonic signal to scare an animal, which comprises:

(a) a rectangularly shaped box housing having a base, a pair of upwardly extending end walls, an upwardly extending front wall with a pair of openings therethrough, an upwardly extending rear wall, a top, and a chamber therein, said chamber having said ultrasonic wave generating system therein;

(b) a pair of speakers, each of said speakers disposed in one of said openings in said front wall, said pair of speakers integrated into said ultrasonic wave generating system;

(c) a pair of mounting plate elements, each said mounting plate element having a hole therethrough, each said plate element mounted perpendicularly onto one of said end walls;

(d) a pair of plate members, each plate member having a hole therethrough, one of said plate members extending linearly outwardly from each end of said base of said housing;

(e) an elongated bar member having a pair of transverse end apertures therethrough, said bar member disposed behind said grill of said automobile;

(f) a pair of hooked shaped clamps, one end of each said clamp having a hole therethrough, another end of each said clamps hooking under a front end of a frame of said automobile; and (g) a plurality of bolt members for securing each said plate element to said bar member and each said plate member to one said end of each said clamp.

* * * * *